United States Patent [19]
Iwasaki

[11] Patent Number: 5,767,966
[45] Date of Patent: Jun. 16, 1998

[54] OPTICAL SPECTRUM MEASURING DEVICE

[75] Inventor: Takashi Iwasaki, Tokyo, Japan

[73] Assignee: Ando Electric Co., Ltd., Tokyo, Japan

[21] Appl. No.: 719,365

[22] Filed: Sep. 25, 1996

[30] Foreign Application Priority Data

Sep. 27, 1995 [JP] Japan ................................. 7-249912

[51] Int. Cl.⁶ ................................................. G01J 3/28
[52] U.S. Cl. ................................................. 356/328
[58] Field of Search ......................... 356/310, 326, 356/328, 300, 330–334

[56] References Cited

U.S. PATENT DOCUMENTS

| | | | |
|---|---|---|---|
| 3,004,465 | 10/1961 | White | 356/330 |
| 4,076,420 | 2/1978 | De Maeyer et al. | 356/73 |
| 4,632,549 | 12/1986 | Czabaffy et al. | 356/300 |

FOREIGN PATENT DOCUMENTS

| | | | |
|---|---|---|---|
| 0075171 | 3/1983 | European Pat. Off. | 356/330 |
| 0 109 536 | 5/1984 | European Pat. Off. | |
| 0 377 737 | 7/1990 | European Pat. Off. | |
| 59-178326 | 10/1984 | Japan | 356/310 |
| 6-221922 | 8/1994 | Japan | |
| 8-101065 | 4/1996 | Japan | |
| 1003316 | 9/1965 | United Kingdom | |
| 1151756 | 5/1969 | United Kingdom | |
| 1 568 397 | 5/1980 | United Kingdom | |
| 2080947 | 2/1982 | United Kingdom | 356/328 |
| WO 94/02835 | 2/1994 | WIPO | |

*Primary Examiner*—K. Hantis
*Attorney, Agent, or Firm*—Finnegan, Henderson, Farabow, Garrett & Dunner, L.L.P.

[57] ABSTRACT

Light source 1 emits light composed of various wavelength components from an emission end 1a. An optical fiber 2 receives the light from one end portion 2a and emits the light from the other end portion 2b. A Czerny-Turner dispersion spectroscope is formed by this end portion 2b, concave mirrors 3 and 5, a diffraction grating 4, and an emission slit 6. A mask 9 restricts the aperture diameter, so as to remove light which has spread wider than the aperture diameter of the mask 9 from the light which has passed through the emission slit 6.

4 Claims, 5 Drawing Sheets

FIG.2A
FIG.2B
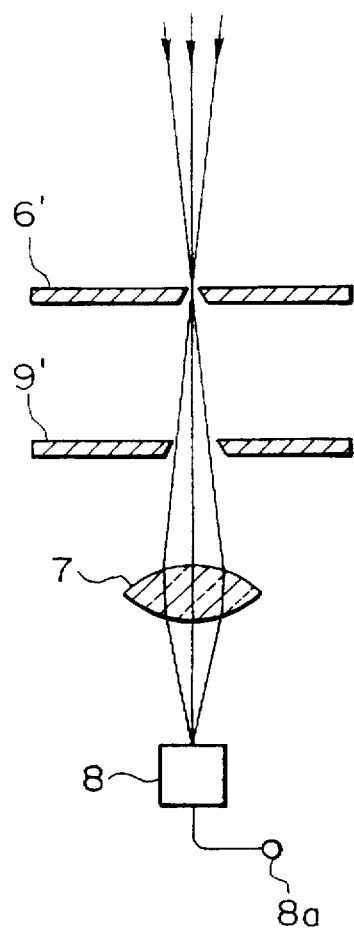
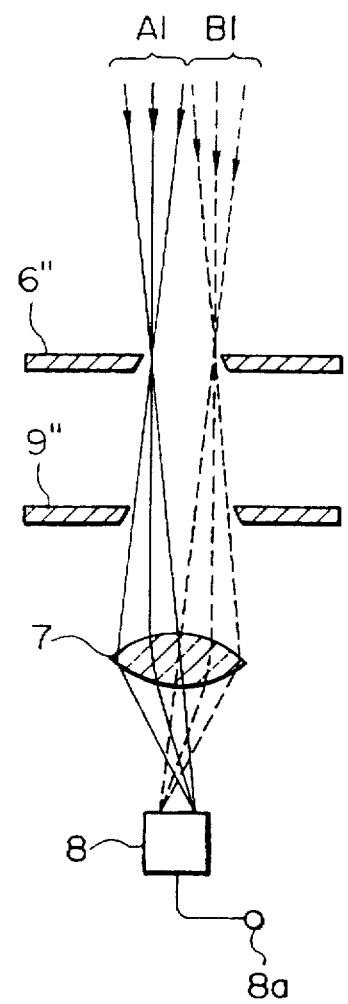

FIG.4A
FIG.4B
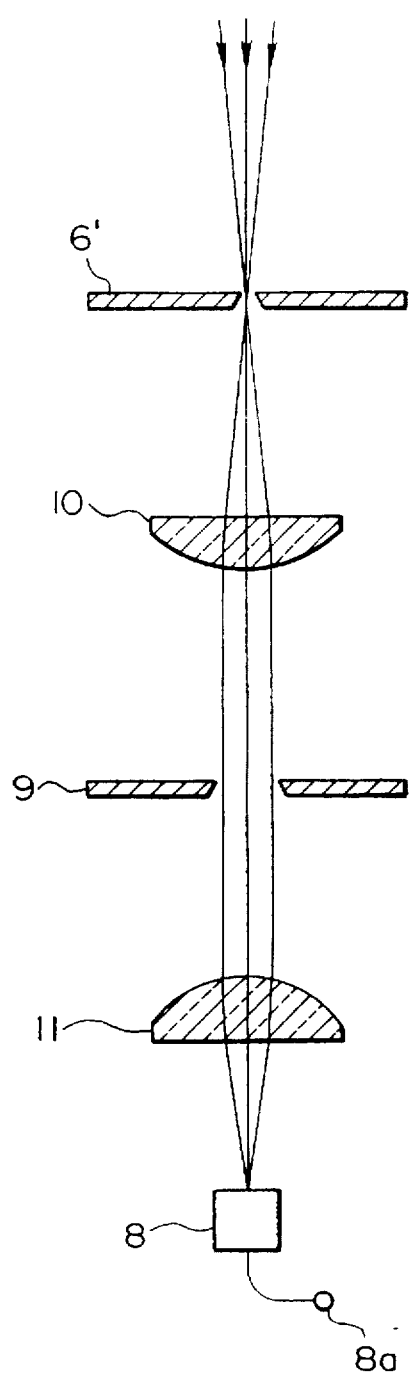
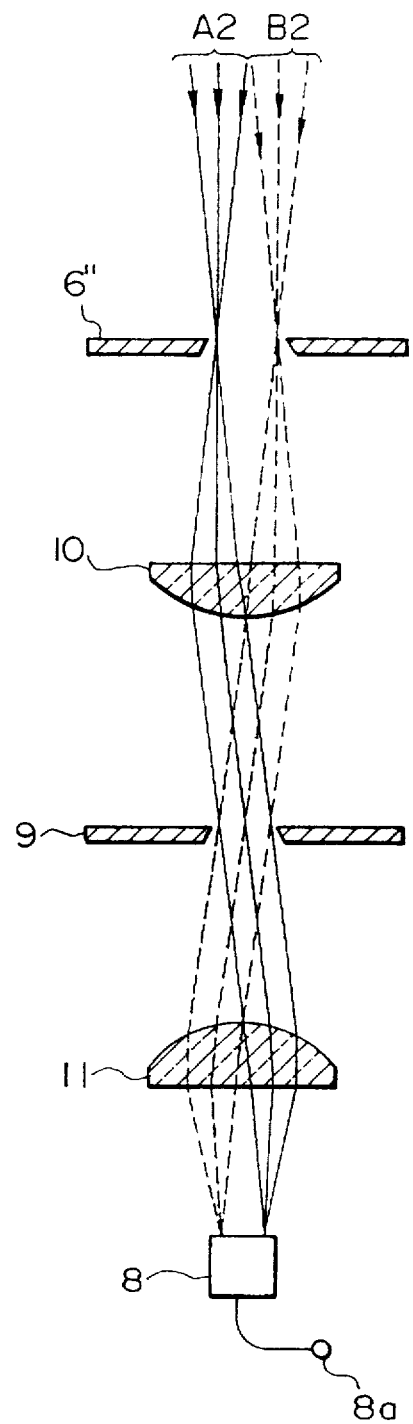

OPTICAL SPECTRUM MEASURING DEVICE

BACKGROUND OF THE INVENTION

1. Technical Field of the Invention

The present invention relates to optical spectrum measuring devices for measuring the optical spectrum characteristics of light sources.

2. Background Art

FIG. 5 is a structural diagram showing structure of a conventional optical spectrum measuring device. In FIG. 5, reference numeral 1 denotes a light source which generates light composed of a variety of wavelengths, this light being emitted from an emission portion 1a. Reference numeral 2 denotes an optical fiber, one end portion 2a of which is disposed near the emission portion 1a of the light source 1. The light from the light source 1 is inputted through this end portion 2a. The light inputted through the end portion 2a propagates through the optical fiber 2 and is emitted from the other end portion 2b.

Reference numeral 3 denotes a concave mirror for reflecting the light emitted from the end portion 2b to make it into a parallel beam. Reference numeral 4 denotes a diffraction grating having multiple linear grooves 4a formed in mutually parallel fashion, which is capable of rotating about an axis 4b which is parallel to these grooves 4a. This diffraction grating 4 diffracts the incident parallel beam into various directions depending on the wavelength, in order to separate it into components by the wavelength. Additionally, reference numeral 5 denotes a concave mirror for reflecting the wavelength components diffracted by the diffraction grating 4 to make it converge. Reference numeral 6 denotes an emission slit for restricting the wavelength components and intensity which are allowed to pass. Reference numeral 7 denotes a lens for converging the light. Reference numeral 8 denotes an optical detector which converts incident light into an electrical signal proportional to the optical intensity, and outputs the converted electrical signal from the output terminal 8a as a detection signal. The above-mentioned end portion 2b, concave mirrors 3 and 5, diffraction grating 4 and emission slit 6 form a Czerny-Turner dispersion spectroscope.

With the above composition, light composed of various wavelength components emitted from the emission portion 1a of the light source 1 is inputted to the end portion 2a of the optical fiber 2, then propagates through the optical fiber 2 to be emitted from the other end portion 2b. The light emitted from the end portion 2b propagates while spreading within the boundary of an angular aperture determined by the numerical aperture of the end portion 2b, then is reflected by the concave mirror 3 to form a parallel beam. Next, this parallel beam is incident on the diffraction grating 4 to be diffracted into different angles depending on the wavelength component. Of the wavelength components diffracted by this diffraction grating 4, the wavelength component diffracted in the direction of the concave mirror 5 is reflected by the concave mirror 5. The wavelength component reflected by this concave mirror 5 has a wavelength width which is dependent upon the degree of dispersion by the diffraction grating 4, the distance between the diffraction grating 4 and the concave mirror 5, and the area of the aperture of the concave mirror 5. Of the wavelength components reflected by the concave mirror 5, only the specific wavelength which is imaged onto the position of the emission slit 6 is able to pass through the emission slit 6.

The wavelength component which has passed through the emission slit 6 is made to converge by the lens 7 and is incident on the optical detector 8. Then, this wavelength component is converted into an electrical signal proportional to the optical intensity, and the converted electrical signal is outputted from the output terminal 8a as a detection signal.

Additionally, if the angle of the diffraction grating 4 in FIG. 5 is set so that a specified wavelength component passes through the emission slit 6, then the optical intensity of the specified wavelength in the light emitted from the emission portion 1a of the light source 1 is able to be known. Additionally, the wavelength-intensity characteristics of the light emitted from the light source 1 can be determined by scanning over the wavelengths by changing the angle of the diffraction grating.

A major factor in evaluating the performance of optical spectrum measuring devices is how well stray light is suppressed. An ideal optical spectrum measuring device should not allow any wavelength components which are outside the wavelength range determined by the width of the emission slit 6 to pass through the emission slit 6 when the angle of the diffraction grating 4 in FIG. 5 is set so that the emission slit 6 passes only a specified wavelength component. However, in actual practice, stray light is generated by errors in the shape of the diffraction grating 4, and aberrations or limitations on the precision of the surfaces of the concave mirrors 3 and 5, which present problems in that extraneous wavelength components are incident on the optical detector 8.

SUMMARY OF THE INVENTION

The present invention takes the above-mentioned situation into consideration, and has the object of presenting an optical spectrum measuring device which can reduce the occurrence of stray light.

In order to resolve the above problems, the present invention offers an optical spectrum measuring device with a spectroscope having at least one emission slit, comprising a mask provided for each emission slit, for restricting an aperture diameter for wavelength components passing through each emission slit.

With the optical spectrum measuring device of the present invention, the mask removes stray light from the wavelength components which have passed through the emission slit of the spectroscope, so that it is possible to obtain wavelength components which contain little stray light.

BRIEF DESCRIPTION OF THE DRAWINGS

FIGS. 2A and 2B are diagrams showing a portion of the optical system of the optical spectrum measuring device shown in FIG. 1.

FIGS. 4A and 4B are diagrams showing a portion of the optical system of the optical spectrum measuring device shown in FIG. 3.

PREFERRED EMBODIMENTS OF THE INVENTION

Hereinbelow, embodiments of the present invention will be explained with reference to the drawings.

[First Embodiment]

Figure 1:
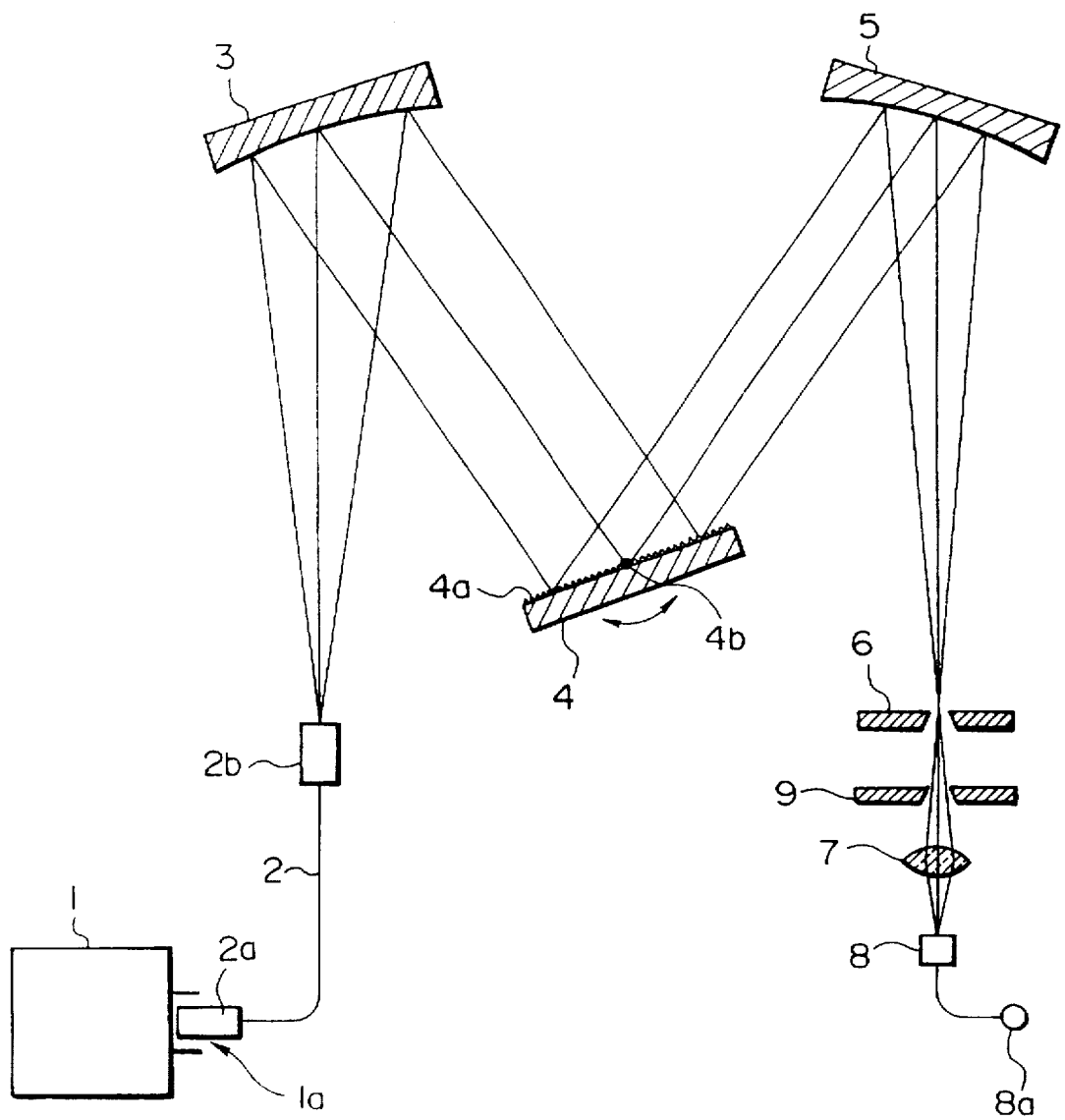
FIG. 1 is a structural diagram showing a first embodiment of an optical spectrum measuring device according to the present invention.
Figure 5:
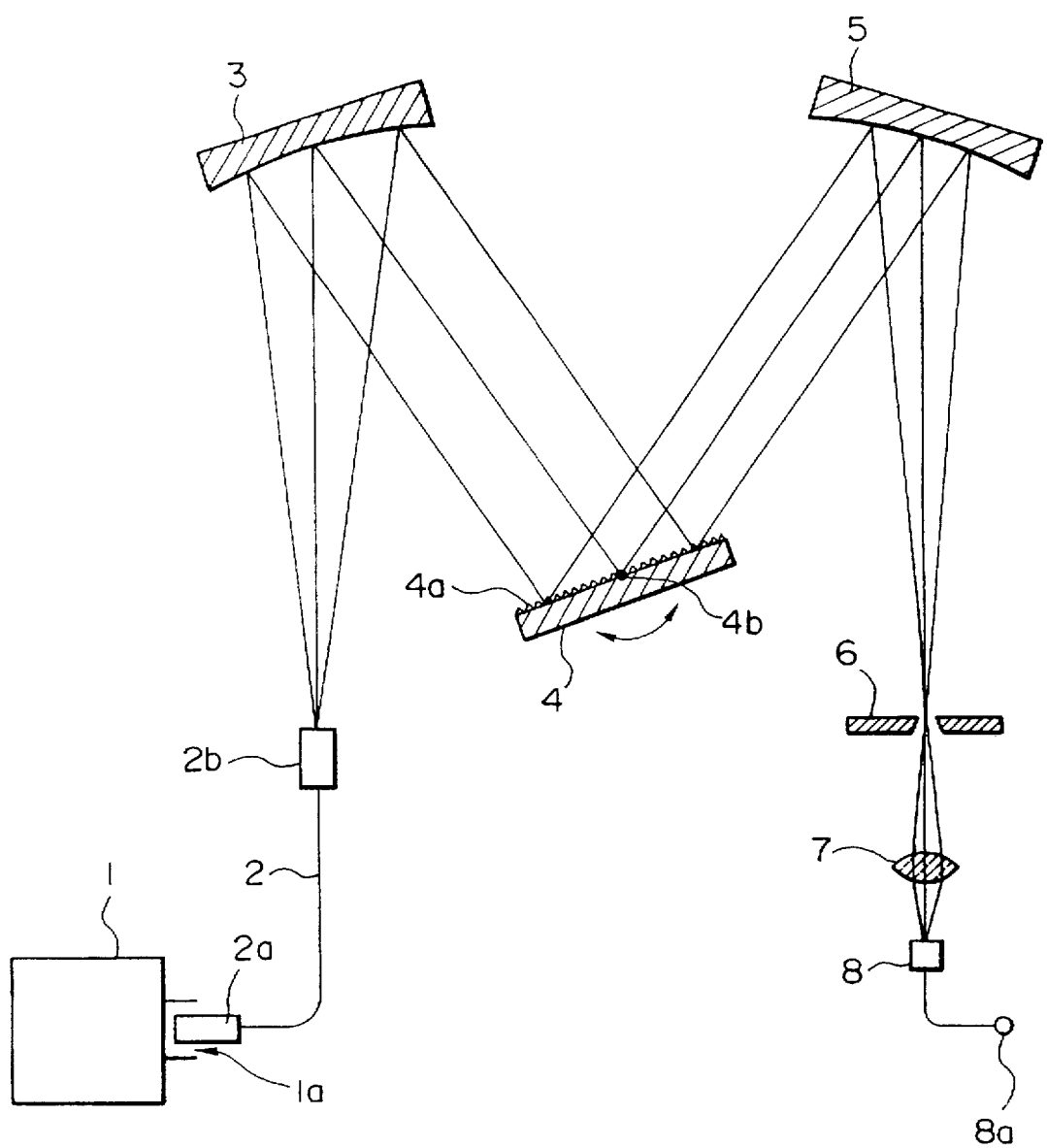
FIG. 5 is a structural diagram showing the structure of a conventional optical spectrum measuring device.

FIG. 1 is a structural diagram showing a first embodiment of the optical spectrum measuring device according to the present invention; in the drawing, the parts which correspond to those in FIG. 5 are labeled with the same reference numerals and their explanation will be omitted. The optical spectrum measuring device shown in this drawing is different from that shown in FIG. 5 in that it has a mask 9 for restricting the width of the aperture. This mask 9 is positioned between the emission slit 6 and the lens 7, and has a circular hole through which the light emitted from the emission slit 6 passes. Additionally, the arrangement is such that the emission slit 6, the center of the hole in the mask 9, and the focal point of the lens 7 lie on the same straight line.

With the above-described structure, an operator first sets the angle of the diffraction grating 4 so that only a specified wavelength component is able to pass through the emission slit 6. Next, light composed of various wavelength components is emitted from the emission portion 1a of the light source 1, and is inputted to the optical fiber 2 through the end portion 2a. The light inputted from the end portion 2a propagates through the optical fiber 2 and is emitted from the other end portion 2b. The light emitted from the end portion 2b propagates while spreading within the boundary of an angular aperture determined by the numerical aperture of the end portion 2b, then is reflected by the concave mirror 3 to form a parallel beam. Next, this parallel beam is incident on the diffraction grating 4 to be diffracted into different angles depending on the wavelength component. Of the wavelength components diffracted by this diffraction grating 4, the wavelength component diffracted in the direction of the concave mirror 5 is reflected by the concave mirror 5. The wavelength component reflected by this concave mirror 5 has a wavelength width which is dependent upon the degree of dispersion by the diffraction grating 4, the distance between the diffraction grating 4 and the concave mirror 5, and the area of the aperture of the concave mirror 5. Of the wavelength components reflected by the concave mirror 5, only the specific wavelength which is imaged onto the position of the emission slit 6 is able to pass through the emission slit 6.

The wavelength components which are emitted from the end portion 2b do not spread more than the aperture angle determined by the numerical aperture of the end portion 2b. Therefore, if the diffraction grating 4 and the concave mirrors 3 and 5 are ideal, then only the specific wavelength component diffracted by the diffraction grating 4 and incident on the concave mirror 5 is imaged onto the position of the emission slit 6 so as to be able to pass through the emission slit 6. However, in actual practice the diffraction grating 4 and the concave mirrors 3 and 5 cause scattering and aberrations, so as to generate stray light. This stray light includes wavelength components other than the wavelength components originally specified for passage through the emission slit 6, and passes through the emission slit 6 without being imaged onto the position of the emission slit 6.

As shown in FIG. 1, the mask 9 restricts the width of the aperture for the specified wavelength component and the stray light which have passed through the emission slit 6. In this case, the specified wavelength component passes through the mask 9, but the parts of the stray light which spread greater than the diameter of the aperture of the mask 9 are not able to pass the mask 9. Consequently, the amount of stray light is reduced.

FIGS. 2A and 2B show a portion of the optical system of the optical spectrum measuring device shown in FIG. 1.

Specifically, FIG. 2A is a drawing showing the path taken by the passing light when the width of the emission slit in FIG. 1 is small, and FIG. 2B is a drawing showing the path taken by the passing light when the width of the emission slit of FIG. 1 is large.

In FIG. 2A, the diameter of the hole in the mask 9' is set to correspond to the aperture angle of the specified wavelength which was originally supposed to pass, when the width is small as with emission slit 6'. However, in actual practice, the width is not always set to be small as with the emission slit 6' of FIG. 2A, and may be opened wider as with the emission slit 6" of FIG. 2B in order to broaden the wavelength bandwidth of passage for the emission slit 6'. In this case, the wavelength components which spread in the direction of the width of the emission slit 6", that is, wavelength components other than those which are imaged onto the position of the emission slit 6' in FIG. 2A are able to pass.

For example, a first wavelength component travels along the path of A1 in FIG. 2B, while a second wavelength component travels along the path of B1 in FIG. 2B. In this case, the detection signal detected at the optical detector 8 indicates the average value of the optical intensities of the wavelength components between the first wavelength component and the second wavelength component; in order to obtain an accurate average value, all of the wavelength components between the first wavelength component and the second wavelength component must be passed. In order to pass both the first wavelength component and the second wavelength component, the diameter of the aperture in the mask 9 of FIG. 1 must be large as with the mask 9" in FIG. 2B, but if the aperture is made larger, then the stray light elimination effect is reduced. Additionally, while it is possible to conceive of a method wherein the diameter of the aperture in the mask 9 is changed in response to the width of the emission slit 6 of FIG. 1, this has a drawback in that the structure of the device becomes more complicated.

[Second Embodiment]

Figure 3:
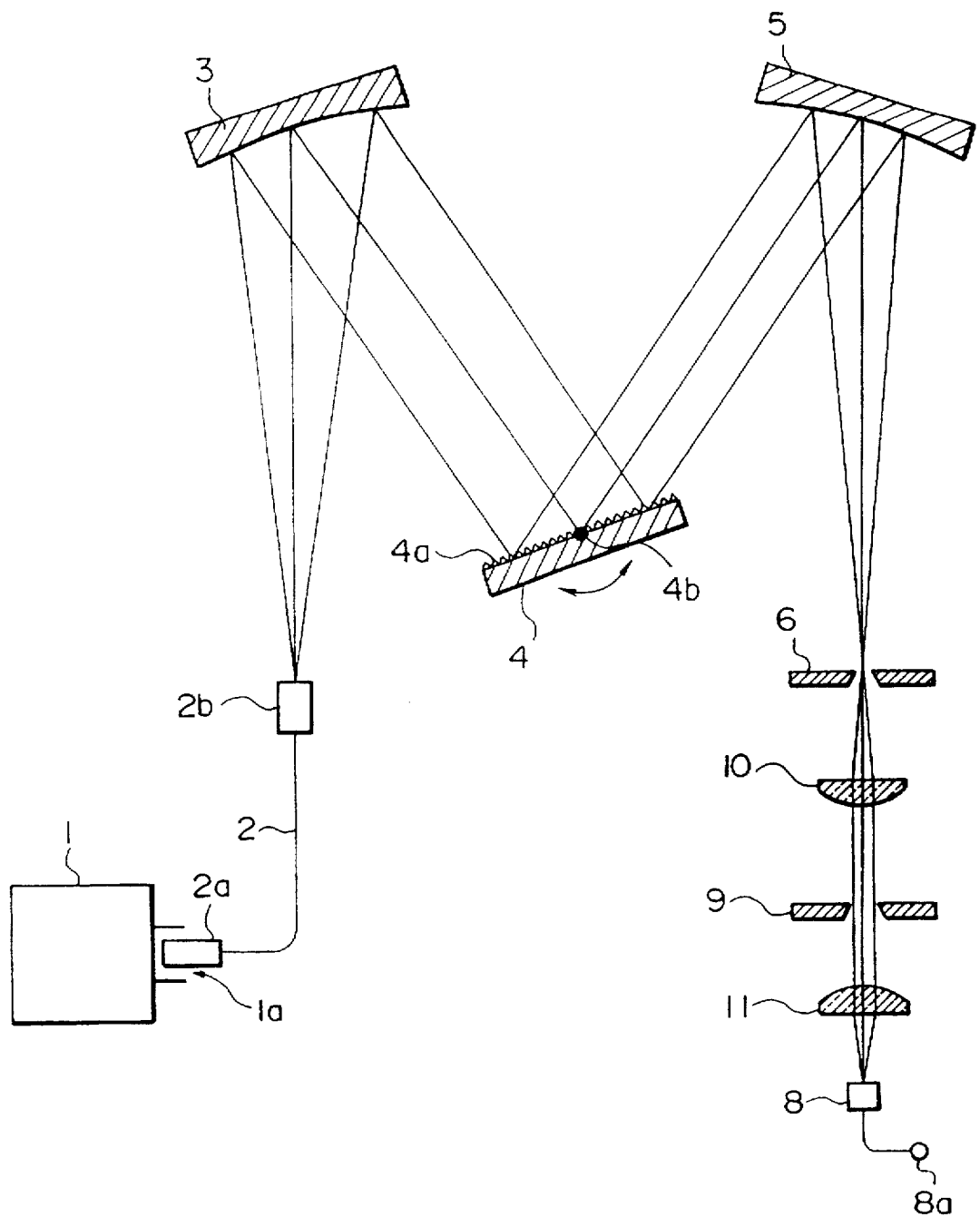
FIG. 3 is a structural diagram showing a second embodiment of an optical spectrum measuring device according to the present invention.

Next, FIG. 3 is a structural diagram showing a second embodiment of the optical spectrum measuring device according to the present invention; in the drawing, the parts which correspond to those in FIG. 1 are labeled with the same reference numerals and their explanation will be omitted. This second embodiment resolves the problems which occur with the first embodiment. In FIG. 3, reference numeral 10 denotes a lens positioned between the emission slit 6 and the mask 9 of FIG. 1, arranged such that the distance from the emission slit 6 is equal to the focal length on one side of the lens 10. This lens 10 is provided for making the wavelength component which passes through the emission slit 6 into a parallel beam. Additionally, a mask 9 is positioned on the other focal point of the lens 10. Reference numeral 11 denotes a lens which is positioned so as to image the light passing through the mask 9 onto the optical detector 8.

Next, the operation of the optical spectrum measuring device according to the second embodiment will be explained; since the operation until the light emitted from the emission portion 1a of the light source 1 has passed the emission slit 6 is identical to the operation explained for the first embodiment, that part of the operation will be omitted from explanation. The light which has passed through the emission slit 6 passes through the lens 10. Since the lens 10 is positioned so that one focal point is aligned with the position of the emission slit 6, the light which has passed through the lens 10 forms a parallel beam. Additionally, since the mask 9 is positioned at the other focal point of the lens 10, the position of passage of light on the mask 9 which has become a parallel beam at the lens 10 is always constant, without depending on the wavelength component.

The reason that the position of passage is constant and does not depend on the wavelength component will be explained with reference to FIGS. 4A and 4B. FIGS. 4A and 4B are diagrams showing a portion of the structure of the optical spectrum measuring device. Additionally, FIG. 4A is a diagram showing the path taken by the light when the width of the emission slit 6 in FIG. 3 is small, and FIG. 4B is a diagram showing the path taken by the light when the width of the emission slit 6 in FIG. 3 is large.

When the width of the emission slit 6 in FIG. 3 is small, as with the emission slit 6' in FIG. 4A, the diameter of the aperture in the mask 9 can be set to pass only specific wavelength components that originally should be passed. Additionally, when the width of the emission slit 6 in FIG. 3 is large as with the emission slit 6" in FIG. 4B, the range of wavelengths of the light, following different paths in passing through the emission slit 6", is broadened. For example, a first wavelength component travels along the path A2 in FIG. 4B, while a second wavelength component travels along the path B2 in FIG. 4B. However, since the mask 9 is positioned at one of the focal points of the lens 10, the position of passage on the mask 9 is identical for the wavelength component which has followed the path of A2 and the wavelength component which has followed the path of B2. Therefore, it is possible to use a mask 9 having an aperture diameter which is equal to the aperture diameter of the mask 9 in FIG. 4A. In other words, there is no need to change the aperture diameter of the mask 9 even if the width of the emission slit 6 in FIG. 3 is changed, as a result of which the maximum stray light elimination effect can be gained.

With the first embodiment, the mask 9 can be positioned between the lens 7 and the optical detector 8 in FIG. 1. Additionally, while the hole in the mask 9 is explained to be circular in the first embodiment and the second embodiment, the shape is not restricted thereto, and the hole in the mask 9 can be slit-shaped or pinhole-shaped. Furthermore, while the spectroscopes in the first embodiment and the second embodiment are explained to be Czerny-Turner dispersion spectroscopes, they are not restricted to such an arrangement, and other types of spectroscopes such as Littrow-type dispersion spectroscopes can be used.

Additionally, while the light emitted from the emission portion 1a of the light source 1 is conveyed by the optical fiber 2, the light may also be conveyed through the air. In this case, an incident slit would correspond to the end portion 2b in FIG. 1.

Furthermore, lenses may be used instead of the concave mirrors 3 and 5. Alternatively, the diffraction grating 4 can be a concave diffraction grating, in which case it would also serve the functions of the concave mirror 3 and 5 so that the concave mirrors 3 and 5 would not have to be used.

Using a spectroscope wherein the focal lengths of the concave mirrors were 280 mm, the number of grooves in the diffraction grating was 900/mm and the width of the emission slit was 15 μm with an optical spectrum measuring device according to the present invention, the optical intensity of stray light of wavelength components separated by 1 nm from the wavelength 1523.1 was measured. As a result, it was confirmed that the intensity of the stray light was reduced by approximately 40% with the structures of FIGS. 1 and 3 in comparison to the structure of the conventional optical spectrum measuring device shown in FIG. 5.

I claim:

1. An optical spectrum measuring device with a spectroscope having at least one emission slit, comprising:

a first lens provided for each emission slit, arranged so that said emission slit is aligned on a focal point thereof, for converting light passing through said emission slit into a parallel beam; and a mask positioned on the other focal point of said first lens, for passing said parallel beam to a constant position and restricting an aperture diameter.

2. An optical spectrum measuring device according to claim 1, wherein said spectroscope comprises:

a concave mirror for converting light incident from an incident end into a parallel beam;

a diffraction grating for spatially diffracting said parallel beam; and a concave mirror for making a portion of wavelength components diffracted by said diffraction grating converge at said emission slit.

3. An optical spectrum measuring device according to claim 2, wherein said incident end is formed by an end of an optical fiber.

4. An optical spectrum measuring device according to claim 1, comprising:

a second lens for making light that passes through said mask converge; and an optical detector position at a focal point of said second lens.

* * * * *